United States Patent [19]
Kurahara

[11] Patent Number: 5,615,390
[45] Date of Patent: Mar. 25, 1997

[54] SYSTEM FOR DETERMINING AND CONTROLLING THE INPUT/OUTPUT MODE OF INPUT/OUTPUT TERMINAL OF MICROCOMPUTER USING RESET SIGNAL CHANGE POINT DETECTION CIRCUIT

[75] Inventor: Kensei Kurahara, Tokyo, Japan

[73] Assignee: NEC Corporation, Tokyo, Japan

[21] Appl. No.: 44,533

[22] Filed: Apr. 8, 1993

[30] Foreign Application Priority Data

Apr. 8, 1992 [JP] Japan ................................. 4-086777

[51] Int. Cl.$^6$ ................................................. G06F 15/02
[52] U.S. Cl. ............................. 395/834; 395/250; 395/800
[58] Field of Search ............................... 395/275, 725, 395/250, 832, 834, 851, 800; 365/189.05, 222, 195, 189.01

[56] References Cited

U.S. PATENT DOCUMENTS

| | | | |
|---|---|---|---|
| 4,672,583 | 6/1987 | Nakaizumi | 365/222 |
| 4,835,743 | 5/1989 | Hidaka et al. | 365/193 |
| 5,155,810 | 10/1992 | McNamara et al. | 395/250 |
| 5,175,533 | 12/1992 | Krenik | 340/701 |
| 5,214,330 | 5/1993 | Okazaki | 307/443 |
| 5,233,241 | 8/1993 | Nishimori | 307/465 |
| 5,369,611 | 11/1994 | Miura | 365/189.05 |

Primary Examiner—Thomas C. Lee
Assistant Examiner—Moustafa Mohamed Meky
Attorney, Agent, or Firm—Whitham, Curtis, Whitham & McGinn

[57] ABSTRACT

In an input/output circuit of a microcomputer, an output latch is connected to an internal bus for latching an output data signal. An output tristate buffer has an input connected to receive a latched output data signal from the output latch and an output connected to the input/output terminal. An input tristate buffer is connected at its input to the input/output terminal. An input/output switchover latch is connected to the internal bus for generating a switchover signal, which is supplied directly to a control input of the output buffer and also through an inverter to a control input of the input buffer, so that the output buffer and the input buffer are alternatively activated by the switchover signal in a complementary manner. The input/output switchover latch is initialized in response to an active reset signal. A reset signal level change point detection circuit receives the reset signal for detecting a point at which the reset signal returns from its active level to its inactive level, and for generating a second reset signal to the output latch, so that after the input/output switchover latch has been initialized in response to the reset signal, the output latch is initialized by the second reset signal.

8 Claims, 4 Drawing Sheets

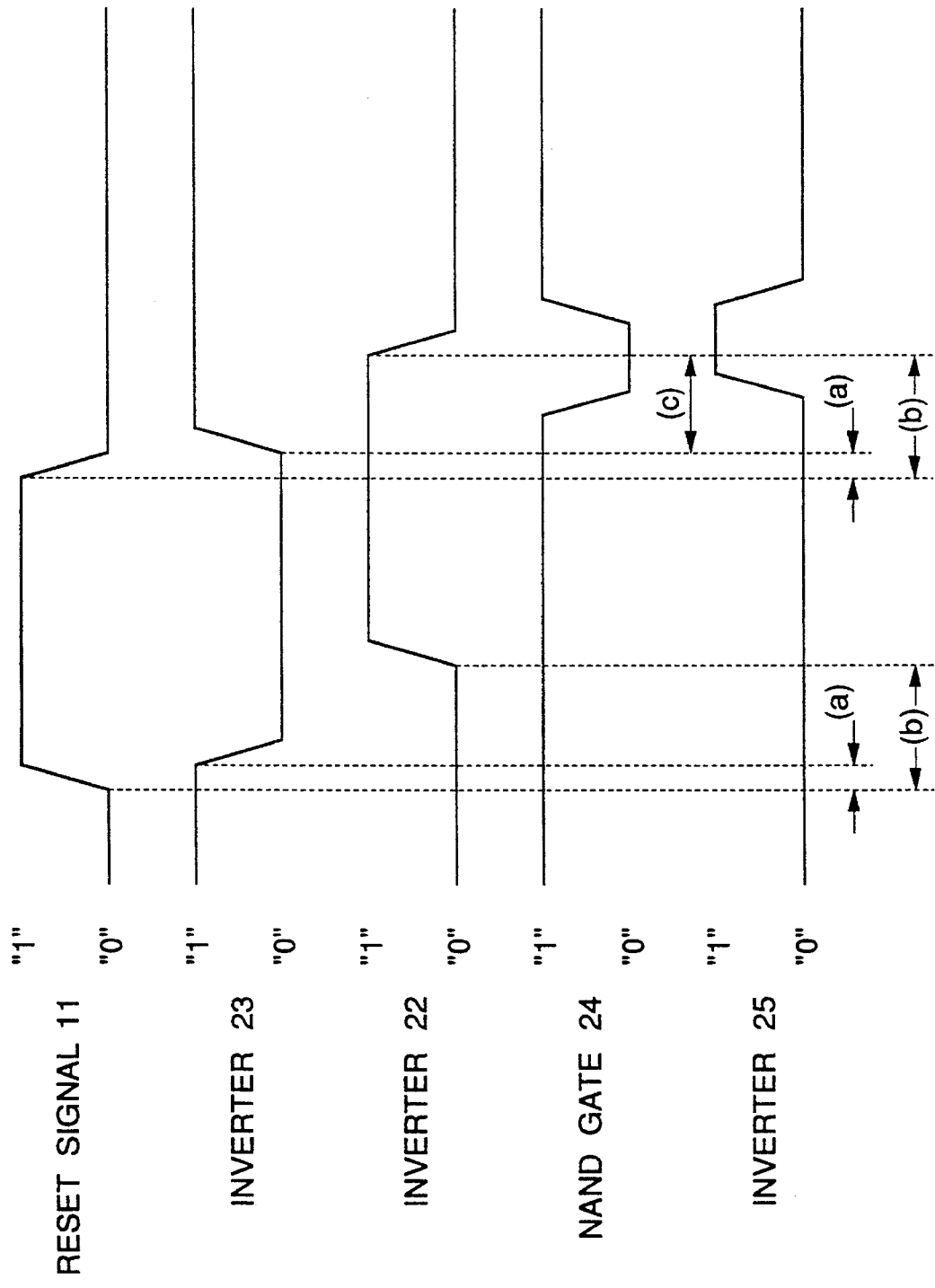

SYSTEM FOR DETERMINING AND CONTROLLING THE INPUT/OUTPUT MODE OF INPUT/OUTPUT TERMINAL OF MICROCOMPUTER USING RESET SIGNAL CHANGE POINT DETECTION CIRCUIT

BACKGROUND OF THE INVENTION

1. Field of the Invention

The present invention relates to a microcomputer, and more specifically to an input/output circuit which is provided in a microcomputer and which has a function of initializing an input/output terminal at the time of resetting.

2. Description of Related Art

In an input/output circuit used in a conventional microcomputer, an internal bus is connected through an output latch and an output buffer to an input/output terminal, and the input/output terminal is also connected to an input buffer and a bus drive circuit to the internal bus. In addition, an input/output switchover circuit is connected to the internal bus, and generates an input/output switchover signal to the output buffer and the input buffer so as to selectively activate either the output buffer or the input buffer. The output latch and the input/output switchover circuit are initialized by a reset signal generated by a reset circuit.

In the above mentioned input/output circuit of the conventional microcomputer, since attention has not been paid to the timings of applying the reset signal to the output latch and the input/output switchover circuit, there is possibility that the timing of the initialization of the output latch is deviated from the timing of the initialization of the input/output switchover circuit because of a propagation delay of the reset signal and other factors. This means that the moment the output signal on the output terminal is caused to change in response to the reset signal is out of time with the moment the input/output switchover signal is caused to change in response to the reset signal. This becomes a problem when the input/output switchover circuit is initialized at a timing delayed from the initialization of the output latch.

In brief, assume that when the signal of "1" is outputted from the input/output terminal, the reset circuit outputs the active reset signal to the output latch and the input/output switchover circuit. At this time, the output latch is initialized so as to output an output data signal of "0", which is supplied through the output buffer to the input/output terminal. Thereafter, with a delayed time, the input/output switchover circuit is initialized so as to activate the input buffer and to inactivate the output buffer, namely, to change the input/output terminal from the output mode to the input mode. In this time sequence, just after the output data signal of the output latch is brought into "0", since the input/output terminal has not yet changed from the output mode to the input mode, the output data signal of "0" is supplied through the output buffer to the input/output terminal. As result, after the resetting operation is started, the output signal on the input/output terminal is caused to charged from "1" to "0" even for a moment, and therefore, the data signal which is different from that before the resetting operation is outputted from the input/output terminal. This is a problem.

SUMMARY OF THE INVENTION

Accordingly, it is an object of the present invention to provide an input/output circuit used in a microcomputer, which has overcome the above mentioned defect of the conventional one.

Another object of the present invention is to provide an input/output circuit which is used in a microcomputer and which never outputs from an input/output terminal a data signal which is different from that before the resetting operation.

The above and other objects of the present invention are achieved in accordance with the present invention by an input/output circuit of a microcomputer, comprising an input/output terminal supplied with an input signal and an output signal, a first storing means storing information for determining an input/output mode of the input/output terminal, the first storing means being initialized in response to an active reset signal, an output buffer having an output connected to the input/output terminal and controlled by an output of the first storing means, a second storing means having its output connected to an input of the output buffer so as to output an output data signal through the output buffer to the input/output terminal, a reset signal level change point detection circuit receiving the reset signal for detecting a point at which the reset signal changes from its active level to its inactive level, and for generating a second reset signal to the second storing means, so that after the first storing means has been initialized in response to the active reset signal, the second storing means is initialized by the second reset signal.

The above and other objects, features and advantages of the present invention will be apparent from the following description of a preferred embodiment of the invention with reference to the accompanying drawings.

BRIEF DESCRIPTION OF THE DRAWINGS

FIG. 4 is a timing chart illustrating the operation of the reset signal level change point detection circuit when the reset signal is activated in the microcomputer.

DESCRIPTION OF THE PREFERRED EMBODIMENT

Figure 1:
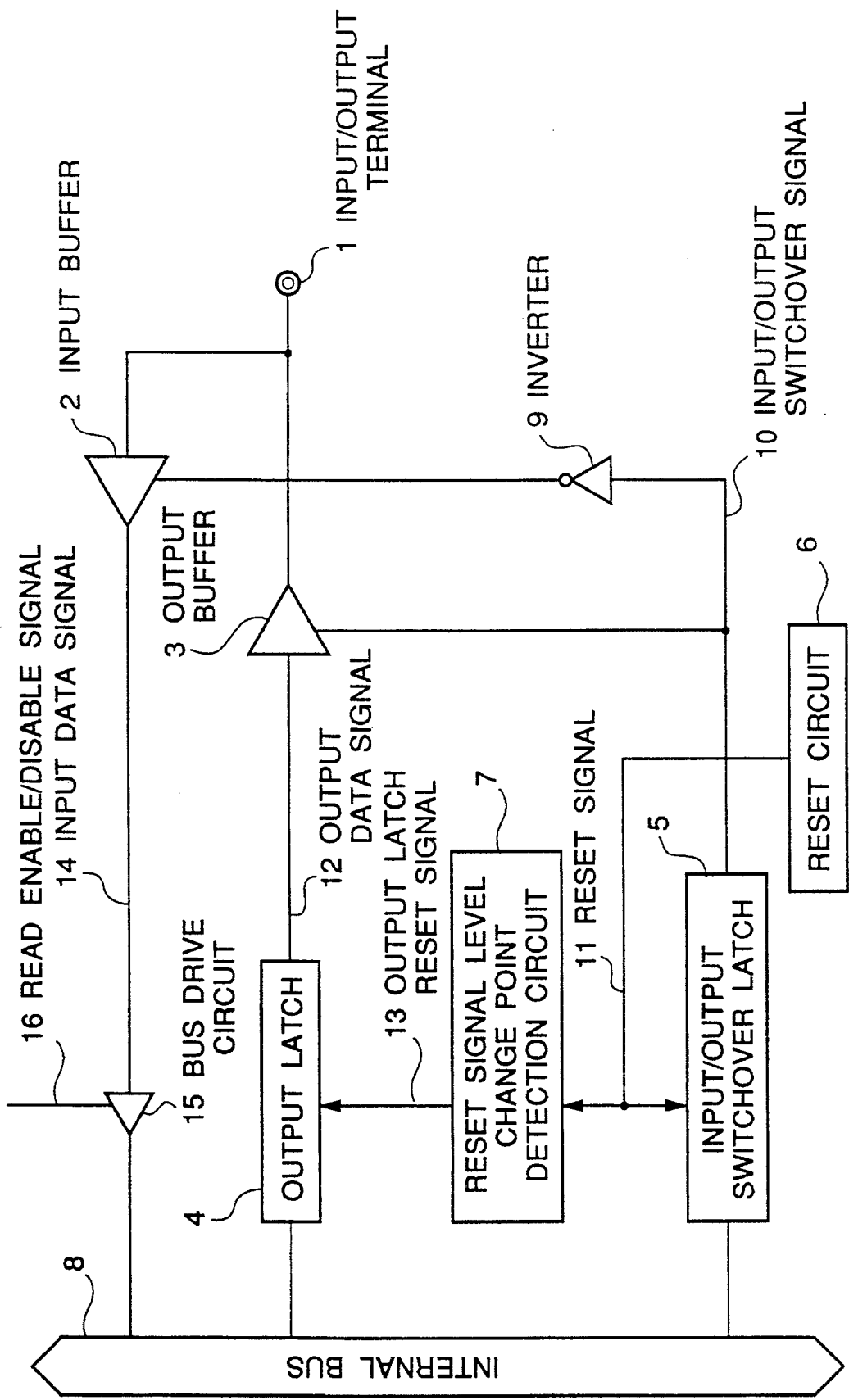
FIG. 1 is a block diagram of an embodiment of the input/output circuit in accordance with the present invention for use in a microcomputer.

Referring to FIG. 1, there is shown a block diagram of an embodiment of the input/output circuit in accordance with the present invention for use in a microcomputer. The shown input/output circuit is provided for each one input/output terminal 1 of a microcomputer (not shown), and therefore, it should be understood that an actual microcomputer contains a plurality of input/output circuits having the same structure as that of the shown input/output circuit.

The shown input/output circuit includes an output latch 4 having an input connected to one line of a number of lines included in an internal bus 8, which is provided for transferring internal data in the microcomputer. The output latch 4 fetches and latches a corresponding output data signal from the internal bus 8, and outputs the latched output data signal 12 to an input of an output tristate buffer 3, which in turn has an output connected to the input/output terminal 1. This input/output terminal 1 is also connected to an input of an input tristate buffer 2, which outputs an input data signal 14 to an input of a bus drive circuit 15. An output of this bus drive circuit 15 is connected to the internal bus 8. The bus drive circuit 15 is controlled by an read enable/disable signal 16 generated in the microcomputer, so as to output the received input data signal 14 to the internal bus 8 when the read enable/disable signal 16 is active. When the enable/disable signal 16 is not active, the received input data signal 14 is not outputted from the bus drive circuit 15 to the internal bus 8.

Furthermore, an input of an input/output switchover latch 5 is connected to another line of a number of lines included in the internal bus 8, so that the input/output switchover latch 5 fetches and latches input/output switchover information from the internal bus 8, and generates an input/output switchover signal 10. In order to switch over an input/output mode between an input mode and an output mode, this input/output switchover signal 10 is supplied directly to a control input of the output buffer 3, and also through an inverter 9 to a control input of the input buffer 2. Namely, activation and inactivation of the output buffer 3 is controlled by the input/output switchover signal 10, so that the enable and disable of the data output is switched over. Activation and inactivation of the input buffer 2 is controlled by an inverted signal of the input/output switchover signal 10, so that the enable and disable of the data input is switched over, complementarily to the enable and disable of the data output.

In addition, there is provided a reset circuit 6 for generating a reset signal 11 not only to the shown input/output circuit but also to the other input/output circuits (not shown) in the microcomputer in the embodiment. This reset signal 11 is supplied to the input/output switchover latch 5 and a reset signal level change point detection circuit 7, which generates an output latch reset signal 13 to the output latch 13.

With the above mentioned arrangement, when data is outputted from the microcomputer to an external, the input/output switchover latch 5 latches the input/output switchover information from the internal bus 8, and activates the input/output switchover signal 10, for example, to "1". The output buffer 3 is activated by the active input/output switchover signal 10 of "1", and the input buffer 2 is inactivated by the inverted signal of "0" outputted from the inverter 9, so that the input/output terminal 1 is brought into the output mode. In this output mode, the output latch 4 latches the output data signal from the internal bus 8, and outputs the output data signal 12 through the activated output buffer 3 to the input/output terminal 1.

On the other hand, when data is inputted from the external to the microcomputer, the input/output switchover latch 5 latches the input/output switchover information from the internal bus 8, and inactivates the input/output switchover signal 10, for example, to "0". Therefore, the output buffer 3 is inactivated by the inactive input/output switchover signal 10 of "0", and the input buffer 2 is activated by the inverted signal of "1" outputted from the inverter 9, so that the input/output terminal 1 is brought into the input mode. In this input mode, a signal on the input/output terminal 1 is supplied through the activated input buffer 2 to the bus drive circuit 15 as the input data signal 14, and when the bus drive circuit 15 is enabled by the read enable/disable signal 16, a corresponding line of the internal bus 8 is driven by the bus drive circuit 15 in accordance with the input data signal 14.

At the time of resetting, the reset circuit 6 outputs the active reset signal 11 to the input/output switchover latch 5 so as to initialize the input/output switchover latch 5. At the same time, the reset signal level change point detection circuit 7 detects a point on which the reset signal 11 returns from its active level to its inactive level, and generates the output latch reset signal 13 in the form of a pulse signal to the output latch 4, so as to initialize the output latch 4.

Figure 3:
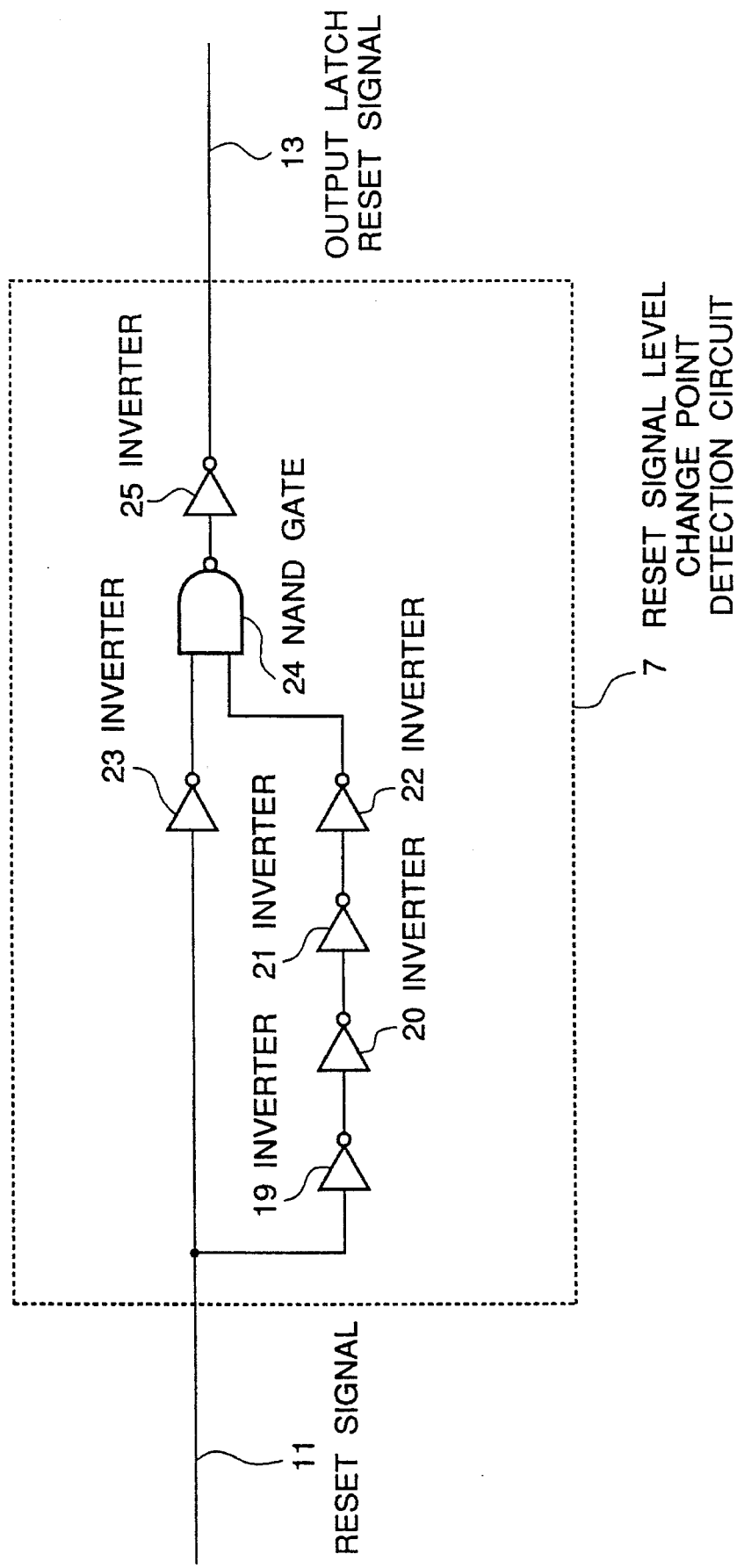
FIG. 3 is a circuit diagram of the reset signal level change point detection circuit included in the input/output circuit.

Referring to FIG. 3, there is shown a circuit diagram of one example of the reset signal level change point detection circuit 7. In order to generate the output latch reset signal 13 in the form of a pulse signal after the reset signal 11 returns from its active level "1" to its inactive level "0", the shown circuit includes four cascaded inverters 19, 20, 21 and 22. The fast stage inverter 19 is contracted to receive the reset signal 11 at its input, and an output of the fourth stage inverter 22 is connected to one input of a NAND gate 24. In addition, the reset signal 11 is also supplied to an input of another inverter 23, whose output is connected to the other input of the NAND gate 24. An output of the NAND gate 24 is connected to an input of an inverter 25, whose output generates the output latch reset signal 13.

Now, operation of the reset signal level change point detection circuit 7 shown in FIG. 3 will be described with reference to FIG. 4, which shows a timing chart illustrating the operation of the reset signal level change point detection circuit at the time of resetting the microcomputer.

When the microcomputer is reset, the reset signal 11 generated by the reset circuit 6 is brought to an active high level for a short time, and thereafter is returned to an inactive low level. In the circuit shown in FIG. 3, the four cascaded inverters 19, 20, 21 and 22 give a delay corresponding to the four inverter stages; and the inverter 23 gives a delay corresponding to only one inverter stage. As shown in FIG. 4, the output of the inverter 23 is brought from its high level to its low level with a delay of one inverter stage from transition of the reset signal 11 from the low level to the high level, and then, is brought from its low level to its high level with the delay of one inverter stage from transition of the reset signal 11 from the high level to the low level. This delay is designated by Reference Character "a" in FIG. 4. On the other hand, the output of the inverter 22 is brought from its low level to its high level with a delay of four inverter stages from transition of the reset signal 11 from the low level to the high level, and then, is brought from its high level to its low level with the delay of four inverter stages from transition of the reset signal 11 from the high level to the low level. This delay is designated by Reference Character "b" in FIG. 4. Accordingly, the NAND gate 24 generates a pulse signal having a pulse width corresponding to a difference "c" between the delay of one inverter stage and the delay of four inverter stages, after the reset signal 11 returns from the active high level "1" to the active low level "0". The pulse signal is inverted by the inverter 25, and the inverted pulse signal is outputted as the output latch reset signal 13.

In the reset signal level change point detection circuit 7 shown in FIG. 3, the four cascaded inverters 19 to 22 can be replaced with an even number of cascaded inverters, a first stage inverter of which has its input connected to receive the reset signal 11 and an output of a final stage inverter of which is connected to the NAND gate 24, and the single inverter 23 van be replaced with an odd number of cascaded inverters, a first stage inverter of which has its input connected to receive the reset signal 11, and an output of a final stage inverter of which is connected to the NAND gate 24. But, the odd number is clearly smaller than the even number, preferably by three or more.

Next, operation of the input/output circuit shown in FIG. 1 at the time of resetting will be explained with reference to FIG. 2, which shows a timing chart illustrating the various signals in the output circuit at the time of resetting the microcomputer when the input/output circuit is in the output mode and the output data signal of "1" is outputted from the input/output terminal.

Figure 2:
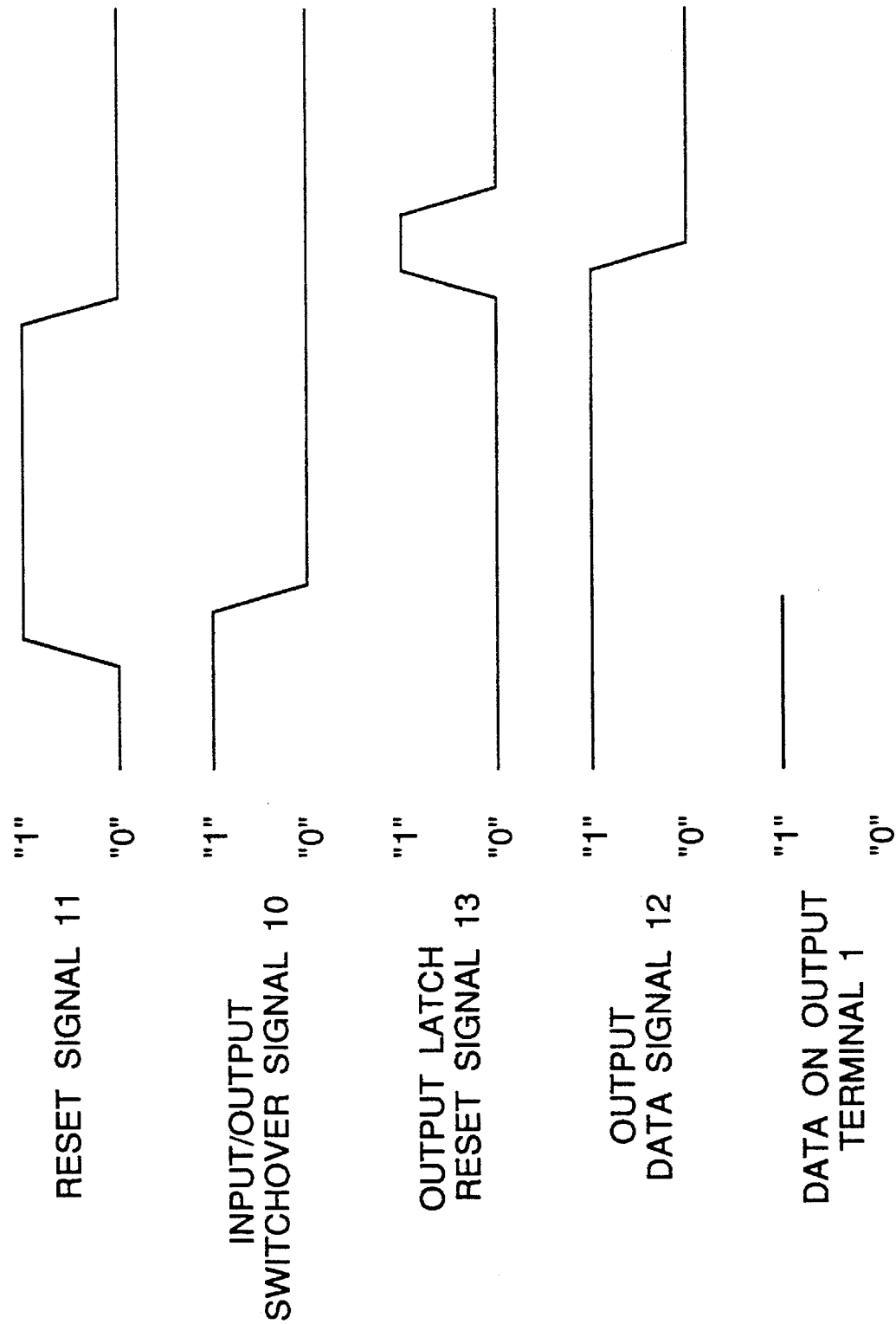
FIG. 2 is a timing chart illustrating the various signals in the output circuit at the time of resetting the microcomputer.

When the reset signal 11 is brought to the active high level so as to initialize the input/output switchover latch 5, the input/output switchover signal 10 generated by the input/output switchover latch 5 is brought to the low level "0", as shown in FIG. 2. Therefore, the output buffer 3 is brought into the inactive condition, and the input buffer 2 is brought into the active condition. Namely, the input/output terminal 1 is changed from the output mode to the input mode, and therefore, the output data signal of "1" on the input/output terminal 1 disappears when the input/output terminal 1 is changed from the output mode to the input mode.

Thereafter, when the reset signal 11 is returned to the inactive low level of "0", the output latch reset signal 13 is generated by the reset signal level change point detection circuit 7, and therefore, the output latch 4 is initialized at this time, so that the output data signal 12 is brought to a low level.

Thus, after the input/output terminal has been completely changed from the output mode to the input mode, the output latch 4 is initialized, and therefore, an error data signal is in no way outputted to the input/output terminal 1 at the time of resetting.

As mentioned above, in the input/output circuit in accordance with the present invention for use in the microcomputer, after the input/output terminal has been changed from the output mode to the input mode in response to the active reset signal and then the reset signal itself has been returned from its active level to its inactive level, the output latch is initialized. Therefore, it is possible to surely prevent an error data signal from being outputted to the input/output terminal of the microcomputer at the time of resetting.

The invention has thus been shown and described with reference to the specific embodiments. However, it should be noted that the present invention is in no way limited to the details of the illustrated structures but changes and modifications may be made within the scope of the appended claims.

I claim:

1. An input/output circuit of a microcomputer, comprising:

an input/output terminal to be supplied with one of an input signal and an output signal;

first storing means storing information for determining an input/output mode of said input/output terminal, said first storing means being initialized in response to a first reset signal;

an output buffer having an output connected to said input/output terminal and selectively activated or inactivated by an output of said first storing means;

second storing means having an output connected to an input of said output buffer for outputting an output data signal through said output buffer to said input/output terminal; and a reset signal level change point detection circuit receiving said first reset signal for detecting a point at which said first reset signal changes from an active level to an inactive level, and for generating a second reset signal, delayed in time from said first reset signal, to said second storing means, so that after said first storing means has been initialized in response to said first reset signal to inactivate said output buffer so that said output data signal is no longer outputted through said output buffer to said input/output terminal, said second storing means is initialized by said second reset signal.

2. An input/output circuit of a microcomputer as claimed in claim 1 wherein said reset signal level change point detection circuit includes:

a set of an even number of cascaded inverters, having a first stage inverter having an input connected to receive said first reset signal, a set of an odd number of cascaded inverters having a first stage inverter having an input connected to receive said reset signal, said odd number being smaller than said even number, a NAND gate having a first input connected to an output of a final stage inverter of said set of even number of cascaded inverters, and a second input connected to an output of a final stage inverter of said set of odd number of cascaded inverters, and an output inverter having an input connected to an output of said NAND gate, an output of said output inverter generating said second reset signal.

3. An input/output circuit of a microcomputer, claimed in claim 1 further comprising:

an input buffer having an input connected to said input/output terminal, said output buffer and said input buffer being alternatively activated by said output of said first storing means in a complementary manner such that when said output buffer is activated, said input buffer is maintained in an inactive condition, and when said input buffer is activated, said output buffer is maintained in an inactive condition.

4. An input/output circuit of a microcomputer, provided for one input/output terminal supplied with an input signal and an output signal, the input/output circuit comprising:

an output latch having an input connected to an internal bus in the microcomputer for latching an output dam signal from said internal bus;

an output tristate buffer having an input connected to receive a latched output dam signal from said output latch and an output connected to said input/output terminal;

an input tristate buffer having an input connected to said input/output terminal and an output through a bus drive circuit to said internal bus;

an input/output switchover latch connected to said internal bus for latching input/output switchover information from said internal bus and for generating an input/output switchover signal, which is supplied directly to a control input of said output buffer and also through an inverter to a control input of said input buffer, so that said output buffer and said input buffer are alternatively activated by said input/output switchover signal in a complementary manner such that when said output buffer is activated, said input buffer is maintained in an inactive condition, and when said input buffer is activated, said output buffer is maintained in an inactive condition, said input/output switchover latch being initialized in response to a first reset signal so as to activate said input buffer and to inactivate said output buffer; and a reset signal level change point detection circuit receiving said first reset signal for detecting a point at which said first reset signal returns from an active level to an inactive level, and for generating a second reset signal to said output latch, so that after said input/output switchover latch has been initialized in response to said first reset signal, said output latch is initialized by said second reset signal.

5. An input/output circuit of a microcomputer, claimed in claim 4 wherein said reset signal level change point detection circuit comprises:

a set of an even number of cascaded inverters having a first stage inverter having an input connected to receive said first reset signal, a single inverter having an input connected to receive said first reset signal, a NAND gate having a first input connected to an output of a final stage inverter of said set of an even number of cascaded inverters, and a second input connected to an output of said single inverter, and an output inverter having an input connected to an output of said NAND gate, an output of said output inverter generating said second reset signal.

6. An input/output circuit having an input/output terminal for both receiving a signal for said circuit and for outputting a signal from said circuit, comprising:

an input buffer connected to said input/output terminal for temporarily holding an input signal presented at said input/output terminal;

an output buffer connected to said input/output terminal for temporarily holding an output signal to be presented to said input/output terminal;

enabling means for supplying complementary enabling signals to said input buffer and to said output buffer such that only one of said input buffer and said output buffer is enabled at a time;

storage means connected to said output buffer for storing said output signal; and delay means for generating a delayed enabling signal for said storage means such that said output buffer becomes enabled prior to said storage means, wherein said delay means comprises a NAND gate;

a single inverter connected to a first input of said NAND gate;

a set of an even number of inverters connected to a second input of said NAND gate; and an inverter connected to an output of said NAND gate.

7. An input/output circuit as recited in claim 6, wherein said storage means comprises a latch.

8. An input/output circuit as recited in claim 6, wherein said delay means comprises a plurality of inverters connected in series.

* * * * *